US005657385A

United States Patent [19]

Reichle

[11] Patent Number: 5,657,385

[45] Date of Patent: Aug. 12, 1997

[54] CONNECTING DEVICE FOR CONNECTING SHEATHED LINES FOR TELEPHONES AND DATA COMMUNICATIONS

[75] Inventor: Hans Reichle, Wetzikon, Switzerland

[73] Assignee: Reichle + De-Massari AG, Wetzikon, Switzerland

[21] Appl. No.: 401,619

[22] Filed: Mar. 9, 1995

[30] Foreign Application Priority Data

Mar. 10, 1994 [CH] Switzerland .......................... 00715/94

[51] Int. Cl.[6] .......................... H01R 9/09; H01R 13/648; H04M 5/02

[52] U.S. Cl. .......................... 379/397; 379/399; 379/327; 439/427; 439/63; 439/92

[58] Field of Search .................................... 439/427, 425, 439/426, 92, 63, 98, 99; 379/399, 397, 326, 327

[56] References Cited

U.S. PATENT DOCUMENTS

| | | | |
|---|---|---|---|
| 4,708,414 | 11/1987 | Lam | 439/394 |
| 4,980,909 | 12/1990 | Meyerhoefer et al. | 379/327 |
| 5,046,952 | 9/1991 | Cohen et al. | 439/63 |
| 5,052,946 | 10/1991 | Homolka | 439/584 |
| 5,116,245 | 5/1992 | Baker | 439/581 |
| 5,344,340 | 9/1994 | Bouleau | 439/581 |
| 5,580,276 | 12/1996 | Mussen | 439/63 X |

*Primary Examiner*—Thomas W. Brown
*Assistant Examiner*—Devendra T. Kümar
*Attorney, Agent, or Firm*—Spencer & Frank

[57] ABSTRACT

The device for connecting sheathed lines for telephones and data communications is characterized by a metallic ground plate with supports on a printed circuit board, etc. with one bent-back tongue which forms a contact spike for lateral insertion of a sheathed line or cable between its sheath and cover, and a second tongue located at a distance from and at least nearly parallel to the contact spike which forms a trough for supporting cables. This trough can be bent towards the contact spike by stripping the cable with a cable binder.

6 Claims, 1 Drawing Sheet

CONNECTING DEVICE FOR CONNECTING SHEATHED LINES FOR TELEPHONES AND DATA COMMUNICATIONS

BACKGROUND OF THE INVENTION

The present invention relates to a device for connecting sheathed lines for telephones and data communications.

In the field of telephones or other fields of signal transmission, electrical lines which provide protection from disturbing external electrical fields by means of very conductive metallic sheaths are indispensable. However, a problem occurs in the installation of such electrical lines in the connection system, such as printed circuit boards, etc., especially with regard to optimum grounding of the sheath for high frequency near the line connection, for which the cable sheath is first laid bare by removing the cable covering and then the cable sheath is enveloped by friction springs, etc. Strain is then relieved, which is indispensable in this connection, with cable binders located in a row at a point on the cable axis in relation to the sheath contact.

Aside from the relatively great depth required for this method, a clamp contact for the cable sheath is unsafe. In addition, the cable must be stripped in stages, which often damages the cable sheath. Furthermore, this type of cable end often frays.

SUMMARY OF THE INVENTION

Therefore, the task of the present invention is to create a device for connecting sheathed lines for telephones and data communication, which eliminates the deficiencies of the known state of the art and allows all diameters for contacts between braided and foil sheaths of sheathed lines which are suitable for high frequency, and with the simplest handling possible without tools, and without requiring stripping, and with strain relief in a way which saves space.

All this is achieved according to the invention in that a metallic ground plate with supports on a printed circuit board, etc. has one bent-back tongue which forms a contact spike for frontal insertion into a sheathed line or cable between its sheath and cover. A second tongue is located at a distance from and at least nearly parallel to the contact spike which forms a trough for supporting the cable and which can be bent towards the contact spike by stripping the cable with a cable binder.

In this connection, elastic zones configured to allow adaptation to various thicknesses of cable covers comprise a preferable embodiment of the joint of the contact spike or trough.

Furthermore, the presence of several contact spikes extending from the ground plate with associated troughs for supporting the cables, and at least one cable lug tongue extending laterally from the ground plate, and a catch for a shroud connection which is bent away from the ground plate laterally are advantageous.

The device configured as one piece is practical.

Optimum sheath contact with regard to high frequency is created in this way, whereby the coaxial arrangement of sheath contact and cable binder requires only a small amount of space for assembly. Moreover, tightening the cable binder simultaneously flattens the contact spike on the sheath, thereby ensuring wide-area contact. At the same time, the contact point is protected under the cable cover.

BRIEF DESCRIPTION OF THE DRAWING

An example of an embodiment of the object of the invention is illustrated in more detail in the drawings below. The following is shown.

DETAILED DESCRIPTION OF THE PREFERRED EMBODIMENTS

Figure 1:
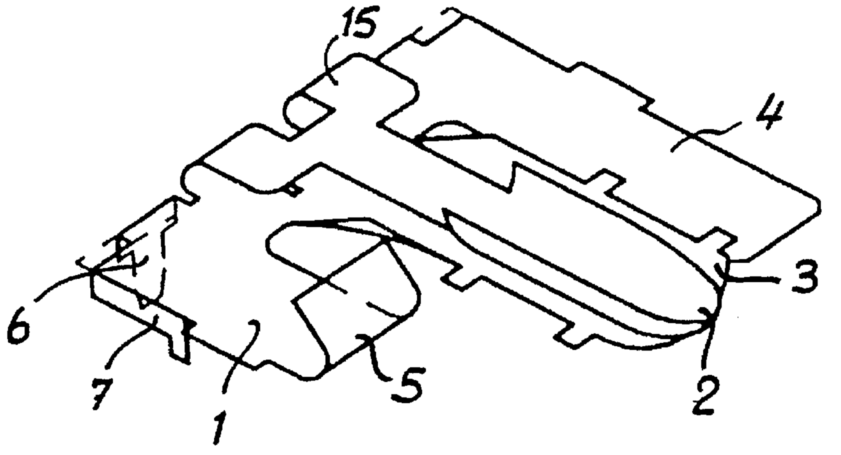
FIG. 1 is a diagram of the one-piece device for connecting sheathed lines.
Figure 2:
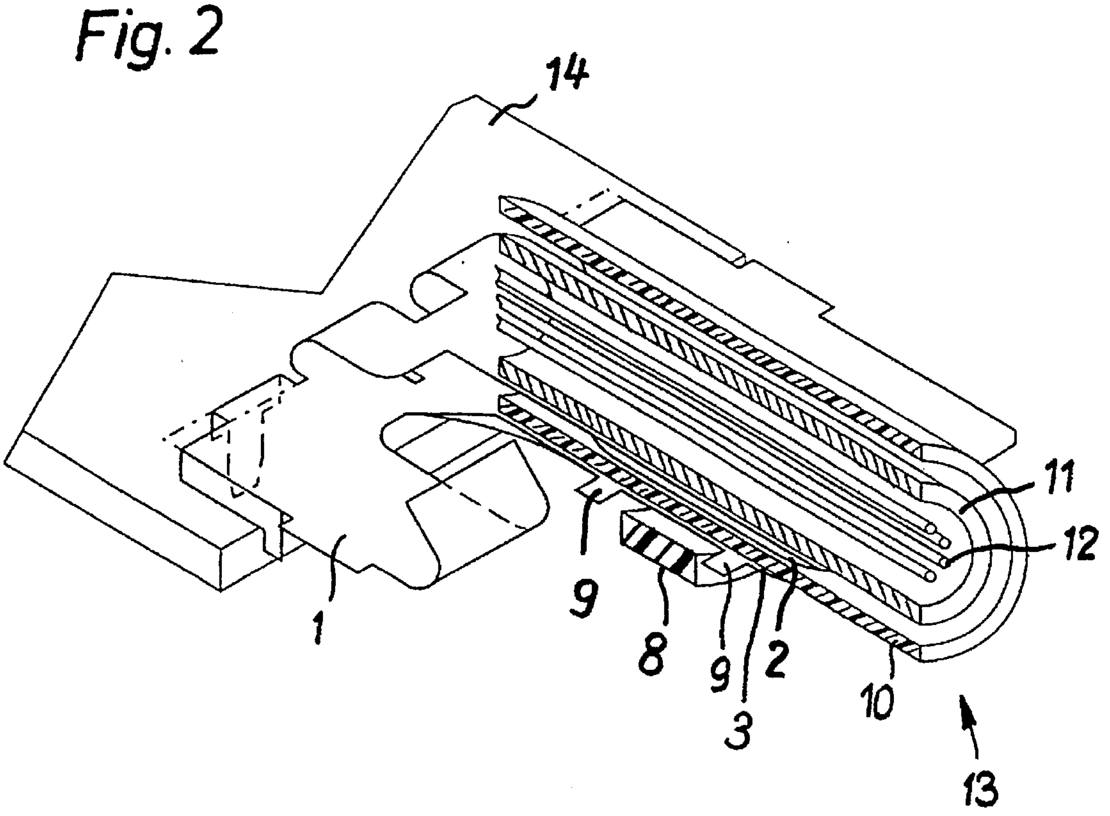
FIG. 2 is the arrangement according to FIG. 1, with a sheathed line.

In accordance with FIGS. 1 and 2, the device for connecting sheathed lines for telephones and data communication comprises a metallic ground plate 1 with supports, locatable on a printed circuit board 14, etc. The device has one bent-back tongue which forms a contact spike 2 for frontal insertion into a sheathed line or cable 13, between the lines sheath 11 and cable cover 10. Furthermore, a second tongue located at a distance from, and at least nearly parallel and superposed to the contact spike 2 forms a trough 3 for supporting the cable 13. The trough 3 can be bent towards the contact spike 2 by stripping the cable with a cable binder 8.

In this connection, the cable binder 8 is run between the lateral limits 9 of the trough 3.

The ground plate 1 can be screwed to, plugged into or connected by means of soldered tongues 6 to the printed circuit board 14 or other supports. Supporting shoulders 7 can be used to ensure greater stability.

Furthermore, the joint of the contact spike 2 or the trough 3 can comprise an elastic zone 15 for the purpose of adaptation to various thicknesses of cable covers.

For a multiple embodiment, several contact spikes with assigned troughs extending from the .ground plate 1 are provided (not shown).

A further embodiment is possible with at least one cable lug tongue 4 extending laterally from the ground plate and a catch 5 for a shroud connection which is bent away from the ground plate laterally (not shown).

Furthermore, it is important for the invention that the device is configured as one piece.

While there are shown and described preferred embodiments of the invention, it is to be distinctly understood that the invention is not limited thereto but may be embodied and practised within the scope of the following claims.

ACCORDINGLY;

What I claim is:

1. A device for connecting sheathed lines for telephones or data communications, comprising:

a metallic ground plate having supports connectable to a printed circuit board;

at least one bent-back contact spike attached to said ground plate, and being insertable into a front end of a sheathed line or sheathed cable between a sheath and a cover; and at least one tongue attached to said ground plate and located at a distance from and essentially parallel and superposed to said contact spike, said tongue forming a trough for supporting the cable or line, and being bendable towards said contact spike by stripping the cable or line with a cable binder.

2. A device as claimed in claim 1, wherein said contact spike and said tongue are attached to said ground plate at respective joints, and wherein the joint of one of the contact spike and the tongue forms an elastic zone for adapting said device to various thicknesses of cable or line covers.

3. A device as claimed in claim 1, wherein said at least one contact spike comprises a plurality of contact spikes, each extending from said ground plate, and wherein said at least one tongue comprises a plurality of tongues, each being associated with a respective contact spike.

4. A device as claimed in claim 1, further comprising at least one cable lug tongue extending laterally from said ground plate.

5. A device as claimed in claim 1, further comprising at least one catch extending laterally from said ground plate.

6. A device as claimed in claim 1, wherein said device is one-piece.

* * * * *